United States Patent [19]

Drabarek

[11] Patent Number: 5,440,389
[45] Date of Patent: Aug. 8, 1995

[54] OPTICAL SENSOR FOR ROTATIONAL MOVEMENTS HAVING AN OPTICAL RUNNING PERIOD ELEMENT

[75] Inventor: Pawel Drabarek, Ditzingen, Germany

[73] Assignee: Robert Bosch GmbH, Stuttgart, Germany

[21] Appl. No.: 196,236

[22] PCT Filed: Aug. 20, 1992

[86] PCT No.: PCT/DE92/00695
§ 371 Date: Feb. 17, 1994
§ 102(e) Date: Feb. 17, 1994

[87] PCT Pub. No.: WO93/05364
PCT Pub. Date: Mar. 18, 1993

[30] Foreign Application Priority Data

Sep. 2, 1991 [DE] Germany ............... 41 29 085.2

[51] Int. Cl.⁶ ........................................ G01C 19/72
[52] U.S. Cl. .................................................. 356/350
[58] Field of Search ...................................... 356/350

[56] References Cited

FOREIGN PATENT DOCUMENTS 4340416 11/1992 Japan ................................ 356/350
2119083 11/1983 United Kingdom ............. 356/350

OTHER PUBLICATIONS

IEE Proceedings vol. 132, No. 5, Oct. 1985, Stevenage Herts GB pp. 265–270; I. P. Giles 'Feasibility of a Heterodyne All–Fibre Optical Gyroscope'.
Applied Optics vol. 29, No. 9, Mar. 20, 1990, pp. 1345–1349, XP102330; Hotate and Samukawa 'Drift Reduction in an Optical Heterodyne Fiber Gyro'.
Spie Milestone Series vol. MS 8, 1988, Bellingham Washington USA pp. 421–428, XP 23306; Ohtsuka 'Optical Heterodyne–Detection Schemes for Fiber-Optic Gyroscopies'.

Primary Examiner—Samuel A. Turner
Attorney, Agent, or Firm—Spencer, Frank & Schneider

[57] ABSTRACT

An optical sensor for rotational movements is proposed that includes a semiconductor laser that is at least intermittently activated, and whose frequency-modulated beam is split into two partial beams that respectively pass through an annular optical fiber arrangement in opposite directions, are subsequently superposed as coupled-out signals and conducted to a photodetector that emits an output signal that has a predeterminable heterodyne frequency, and whose phase position permits the determination of the rate of rotation of the arrangement with respect to a reference signal. The sensor of the invention can be installed into integrated optics, wherein all of the optical beams can be guided in optical fibers. The sensor of the invention is particularly suited as an optical fiber gyro or a rotation rate sensor.

17 Claims, 3 Drawing Sheets

OPTICAL SENSOR FOR ROTATIONAL MOVEMENTS HAVING AN OPTICAL RUNNING PERIOD ELEMENT

BACKGROUND OF THE INVENTION

1. Field of the Invention

The invention is based on an optical sensor for rotational movements of the generic type having a laser beam source, a device for splitting the beam emitted by the laser beam source into first and second partial beams, an annular optical fiber arrangement into which the first partial beam is coupled in a first direction and the second partial beam is coupled in a second direction, with the first and second directions being opposite, and a photodetector into which first and second partial beams are coupled out of the annular optical fiber arrangement are supplied. An optical sensor of this type is known from the publication by K. HOTATE and S SAMUKAWA, "Drift reduction in an optical heterodyne fiber gyro," Applied Optics, Vol. 29, No. 9, Mar. 20, 1990, pp. 1345-1349. The Sagnac effect, which occurs in a fiber optical gyro, is the basis of the known sensor. The beam generated by a laser diode is split into two partial beams with a grating and a beam splitter, and subsequently coupled into an optical fiber disposed in annular form. One partial beam passes through the fiber clockwise, and the other partial beam passes through counterclockwise. The beams coupled out of the fiber are conducted through the beam splitter and impact upon an acousto-optical modulator that superposes the beams. The grating and the acousto-optical modulator, whose angles of diffraction are identical, are disposed symmetrically with respect to the beam splitter. A photodetector receives a non-refracted portion of the beam that has circulated clockwise in the fiber, the frequency of the beam being identical to the frequency of the semiconductor laser beam. Moreover, the photodetector receives a diffracted portion of the beam rotating counterclockwise in the fiber and having a frequency that is altered by the magnitude of the frequency generated by the acousto-optical modulator, with respect to the beam produced by the semiconductor laser. The photodetector emits as an output signal the altered frequency designated as the heterodyne frequency. A rotation of the optical fiber results in a phase shift between the signal emitted by the photodetector and the signal that controls the acousto-optical modulator.

The authors of the publication concede that this above-described optical sensor for rotational movements has drawbacks with regard to zero-point stability that are particularly a function of a temperature drift of the acousto-optical modulator. Thus, in one feature of the known device, a reference path is incorporated that represents an optical short-circuit with respect to the annularly-disposed optical fiber, and upon which the measuring effect has no effect. The measurement process is subdivided into two time segments. The phase of the output signal of the photodetector is stored during the first segment, which must be shorter than the running period of the optical beam through the annularly-disposed acousto-optical modulator, and the two partial beams pass through the optical short-circuit path practically without a time delay. During the second segment, the partial beams coupled out of the annular optical fiber, which at this point have already passed through this fiber, are received by the photodetector. The measurement result is determined through comparison of the phase position of the photodetector signal obtained in the second segment with the photodetector signal obtained in the first segment.

The object of the invention is to provide an optical sensor for rotational movements that can be realized with simple means.

SUMMARY OF THE INVENTION

In accordance with a first embodiment of the sensor of the device, a first beam coupler is provided for coupling out a second partial beam that has passed through an annular optical fiber and for guiding a first partial beam to be coupled into the fiber, and a second coupler is provided for coupling out the first partial beam that has passed through the annular optical fiber and for guiding the second partial beam to be coupled into the fiber. The coupled-out partial beams are superposed and supplied to the photodetector. A signal that can be emitted by the photodetector and that is simple to evaluate is obtained when the two coupled-out beams have a frequency difference that leads to a difference frequency during superposition of the two coupled-out beams that is within, for example, the kHz or MHz range. The frequency difference is achieved by means of a modulation of the frequency of the laser beam source and the use of an optical running period element in one of the two partial beams. A phase comparator determines the phase difference between a signal that corresponds to the laser beam source and the signal emitted by the photodetector. The rate of rotation of the entire sensor can be determined from the phase difference.

The essential advantage of the sensor of the invention lies in its simple design, which only requires conventional fiber optical elements. Because of this, the entire sensor can be designed to be very small and cost-effective. In addition, the option of guiding the occurring optical beams only in optical fibers is particularly advantageous. Interfering influences that could act on externally propagating beams can be avoided with this measure.

The described advantages apply equally for the further embodiments of the sensor in accordance with the invention.

The optical sensor of the invention for rotational movements is suited as an optical fiber gyro in various applications. It is particularly suited as a rotational rate sensor that is provided in, for example, a motor vehicle to control the drive hydraulics. The possible construction with components of the integrated optics, and a compact design without mechanically moved components, make the optical sensor of the invention particularly suitable for installation in vehicles of all types that can be subjected at times to harsh environmental conditions.

In a second embodiment of the sensor in accordance with the invention, a beam path is provided between the first and second couplers that supplies the first partial beam to the photodetector via the second coupler and the second partial beam to the photodetector via the first coupler. This beam path corresponds to the reference path described at the outset in the prior art. However, the further construction and beam guidance are vastly different. Also in this embodiment, a modulator for modulating the beam frequency of the laser and the optical running period element are provided in one of the two partial beams. In addition to the frequency modulation, a further operating mode of the laser is provided, in which the laser is activated for a first, predeterminable time and deactivated for a second, predeterminable time. A provided phase comparator determines a phase difference between the signal emitted by the photodetector during the first time and the signal emitted by the photodetector during the second time.

The advantage of this embodiment in contrast to the first embodiment is that only the signals emitted by the photodetector are used to determine the phase difference. Interfering influences that affect the optical paths do not influence the result.

In accordance with a third embodiment of the sensor of the invention, it is provided that a portion of the first partial beam is coupled out of the first coupler as the first reference beam, and a portion of the second partial beam is coupled out of the second coupler as a second reference beam. The two reference beams are conducted to a reference photodetector. A phase comparator is provided that determines a phase difference between the signals emitted by the photodetector and the reference photodetector.

The advantage of this embodiment is that signals whose phase difference can be determined by the phase comparator can be continuously detected at the two photodetectors. Intermittent laser operation is omitted.

Advantageous features and improvements of the optical sensor for rotational movements in accordance with the invention ensue from the following description.

The embodiment of the entire optical design is advantageously in optical fiber technology. A disturbance of the different beams by environmental conditions is therefore prevented to a great extent. Furthermore, with this measure the structural design of the sensor can be selected arbitrarily within a large scope.

The use of a third beam coupler to unite the two coupled-out partial beams is advantageous. The adjustment procedure that would be necessary because of the superposition of the two partial beams directly at the photodetector is thus eliminated. For the same reasons, the use of a fourth coupler in the third embodiment to superpose the two reference beams is advantageous.

Presetting the same times in the second embodiment during which the laser is activated and deactivated results in the highest possible measured rate.

Additional advantageous features and improvements of the optical sensor for rotational movements in accordance with the invention ensue from the following description.

DETAILED DESCRIPTION OF THE PREFERRED EMBODIMENTS

Figure 1:
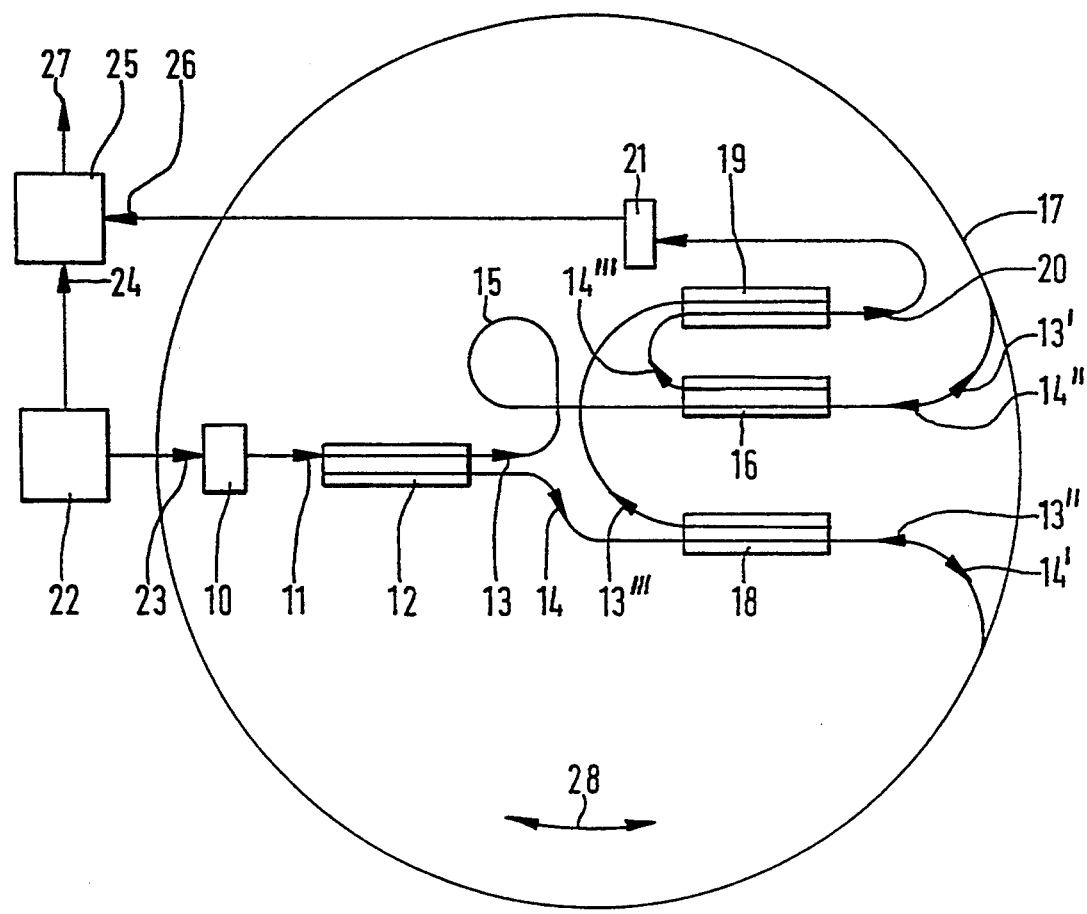
FIG. 1 shows an embodiment of an optical sensor for rotational movement in accordance with the invention.

FIG. 1 shows a laser beams source 10, which transmits a beam 11 to means 12 for splitting the beam 11 into a first and a second partial beam 13, 14.

After passing through an optical running period element 15, the first partial beam 13 enters a first coupler 16, which it exits as a first beam 13' to be coupled into an annular optical fiber arrangement 17. After passing through the arrangement 17, the first partial beam 13, 13' is supplied as a first beam 13'' to be coupled out to a second coupler 18, which it exits as a first coupled-out beam 13'''. After passing through a third coupler 19, the first coupled-out beam 13''' reaches a photodetector 21 as an output beam 20.

After passing through the second coupler 18, the second partial beam 14 becomes the second beam 14' to be coupled into the annular optical fiber arrangement 17. With respect to the first beam 13' to be coupled in, the second beam 14' to be coupled in is coupled into the arrangement 17 in the opposite direction. The second beam 14' to be coupled in exits the arrangement after passing through as the second beam 14'' to be coupled out, and travels to the first coupler 16. The first coupler 16 conducts the second beam 14'' to be coupled out to the third coupler 19 as the second coupled-out beam 14''', which coupler superposes the beam with the first coupled-out beam 13''' to become output beam 20.

The laser 10 is activated by a modulator 22 with a modulation signal 23. The modulator 22 further transmits a signal 24 that corresponds to the modulation signal 23 to a phase comparator 25, to which an output signal 26 of the photodetector 21 is also supplied. A signal that represents a measure for the rate of rotation of the sensor can be taken at an output 27 of the phase comparator 25. The rotation of the sensor has as a reference a mid-point, not shown in FIG. 1. The two directions of rotation are indicated with reference numeral 28 in FIG. 1.

Figure 2:
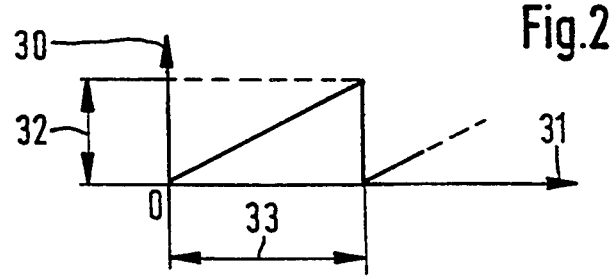
FIGS. 2 and 3 show functional relationships of frequencies of optical beams as a function of the time.

FIG. 2 shows a functional relationship between a frequency 30 of the beam 11 emitted by the laser 10 and the time 31. The maximum frequency difference 32, which is predetermined by the modulation signal 23, occurs within a time interval 33.

Figure 3:
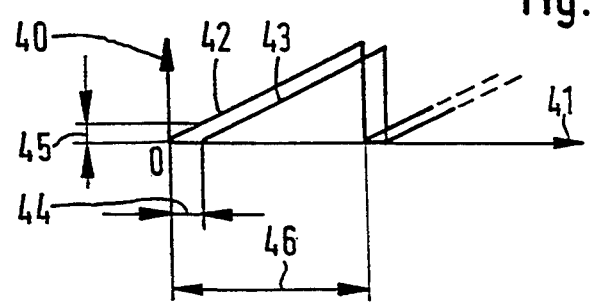

FIG. 3 shows a functional relationship between a frequency 40, which the first beam 13' to be coupled in and the second beam 14' to be coupled in have, and the time 41. The curve course with reference numeral 42 corresponds to the frequency course of the second beam 14' to be coupled in, and the curve course indicated by reference numeral 43 corresponds to the frequency course of the first beam 13' to be coupled in. Curve courses 42, 43 are staggered with respect to one another by the time interval 44, and therefore have a frequency offset 45. The time interval 46 shown in FIG. 3 corresponds to the interval 33 shown in FIG. 2.

The function of the optical sensor for rotational movements shown in FIG. 1 is explained in detail by means of the functional relationships shown in FIGS. 2 and 3:

The optical sensor for rotational movements in accordance with the invention determines the rate of rotation of the annular optical fiber arrangement 17, and thus that of the entire sensor, in one of the two directions of rotation 28. The absolute angular position in relation to a reference angle, as well as an angular acceleration or other characteristic values, can be derived from the rate of rotation. The change in the running period of an optical beam in arrangement 17 that occurs as a result of a path lengthening caused by the rotational movement is used. When the arrangement 17 rotates clockwise, the effective path shortens, for example, that is, the return path of the beam 13' to be coupled in that is in the arrangement 17, while at the same time the path of the beam 14' to be coupled in extends. After superpositioning of the two coupled-out beams 13''', 14''', the entire beam can alternate between the value zero and a maximum value. The absolute level of the output signal 26 emitted by the photodetector 21 would have to be evaluated. Therefore, the heterodyne measurement method is provided, in which the beams 13', 14', to be coupled in already have a predetermined frequency difference. With this measure it is achieved that, even when the arrangement 17 is at rest, an output signal 26 is obtained at the photodetector 21 whose frequency corresponds to the superposition frequency, and only the phase difference between this output signal 26 and a signal 24 that corresponds to the modulation signal 23 is to be evaluated in the phase comparator 25 to determine the rate of rotation.

The modulation signal 23 emitted by the modulator 22 modulates the frequency of the beam 11 emitted by the laser 10. The laser 10 is preferably a semiconductor laser whose current can be modulated. The frequency course of the beam 11 is shown in FIG. 2 as a function of the time. The frequency modulation amplitude corresponds to the maximum frequency difference 32 that occurs during the time interval 33 that corresponds to the modulation period. The frequency difference 32 to be predetermined can be seen in in the relationship with the optical running period element 15, which is disposed in the beam path of the first partial beam 13 or in the beam path of the second partial beam 14. The running period element 15 is realized, for example, as an optical alternate route in optical fiber technology. The alternate route 15 causes a frequency shift between partial beams 13, 13', 13'', 13'''', 14, 14', 14'', 14''' that is shown in FIG. 3. The time interval 44 corresponds to the running period of the optical beam in the alternate route 15. The resulting frequency difference, which is given at all times, is shown in FIG. 3 with frequency offset 45. Interval 44 is shown with an exaggerated length in comparison to interval 33, 46. Interval 44 is within the nanosecond range, for example, which corresponds to an alternate route 15 within the meter range. Interval 33, 46, in contrast, is within the millisecond range, for example. Frequency offset 45 results from the maximum modulation frequency amplitude 32 being divided by the time interval 33, 46 and multiplied with the running period of the alternate route 15. Frequency offset 45 is set within the kHz or MHz range, for example.

A rotation of arrangement 17 leads to a change in the phase position of output signal 26. The rate of rotation can be determined by comparison of the phase of output signal 26 with the phase of a reference signal. The reference signal is derived from the modulator 22. It emits signal 24, which corresponds to modulation signal 23 and has a period corresponding to, for example, time interval 33, 46. The signal 24 corresponding to the modulation signal 23 has a fixed phase relationship to the output signal 26 when arrangement 17 is at rest. A direct comparison of the phase position of signals 24, 26 is generally not possible. The comparator 25 determines the difference by means of a predetermined correction factor that can be determined theoretically or through experiments. A signal that is a measure for the rate of rotation of the annular optical fiber arrangement 17, and thus for the rotation rate of the entire sensor, is available at the comparator output 27.

Figure 4:
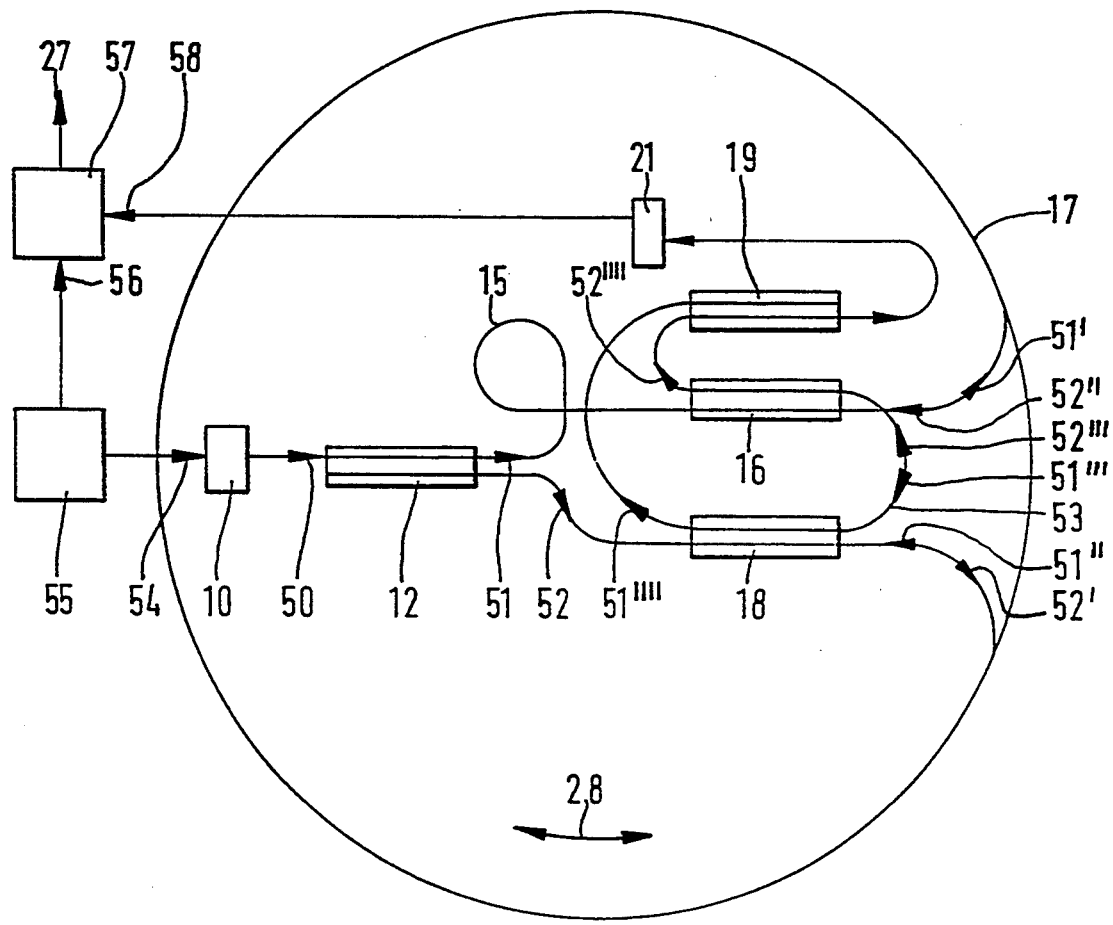
FIG. 4 shows a different embodiment of an optical sensor for rotational movements in accordance with the invention.

FIG. 4 shows a different embodiment of the optical sensor for rotational movements in accordance with the invention. In FIG. 4, those parts that correspond to the parts shown in FIG. 1 have the same reference numerals as in FIG. 1. A first essential difference in the function of the sensor shown in FIG. 4 as compared to the sensor shown in FIG. 1 is that the laser 10 emits no continuous beam. The beam emitted by the laser 10 is therefore indicated in FIG. 4 by reference numeral 50. The beam 50 is split into a first and second partial beam 51, 52. After passing through alternate route 15 and the first coupler 16 as a first beam 51' to be coupled in, the first partial beam 51 enters arrangement 17. The second partial beam 52 becomes a second beam 52' to be coupled in after passing through coupler 18. The two beams 51', 52' to be coupled in travel in opposite directions in arrangement 17. After passing through arrangement 17, the first beam 51' to be coupled in is conducted to the second coupler 18 as a first beam 51'' to be coupled out. The second beam 52' is likewise conducted to the first coupler 16 as a second beam 52'' to be coupled in after passing through arrangement 17.

An optical short-circuit 53 is provided between the two couplers 16, 18. The first coupler 16 couples out a part of the first partial beam 51 as a first reference beam 51''', which is supplied to the second coupler 18. The second coupler 18 couples a part out of the second partial beam 52 as a second reference beam 52''', which is supplied to the first coupler 16. A first beam 51'''' is coupled out of the first coupler 16, and a second beam 52'''' is coupled out of the second coupler 18. The coupled-out beams 51'''', 52'''' respectively correspond in temporal sequence to the first beam 51'' to be coupled out and the second beam 52'' to be coupled out, as well as the first reference beam 51''' and second reference beam 52'''. The temporal relationship will be described later by means of the functional relationships shown in FIG. 5. The beam 50 of laser 10 is activated and deactivated as well as modulated in its frequency with a modulation signal 54. Modulation signal 54 is made available by a modulator 55 that transmits a further control signal 56 to a phase comparator 57. The phase comparator 57 determines phase relationships, as a function of control signal 56, between the output signals 58 occurring in temporal sequence that occur at the photodetector 21.

Figure 5:
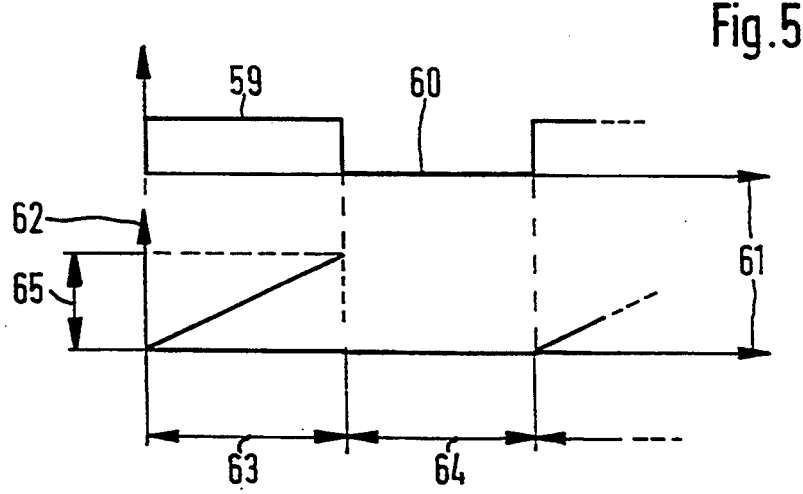
FIG. 5 shows in its upper part a functional connection between an activated period and a pause of a laser and, in its lower part, a functional relationship between frequencies of optical beams and the time.

The upper portion of FIG. 5 shows a functional relationship between an operating time 59 and an operating pause 60 of laser 10 as a function of the time 61. The lower portion of FIG. 5 shows a functional relationship between a frequency 62 of the beam 50 emitted by the laser 10 and the time 61. The same temporal measures are the basis of the upper and lower portions of FIG. 5. Shown is the maximum frequency difference 65, whose value can correspond to the frequency difference 32 shown in FIG. 2. The frequency modulation takes place during a first time interval 63, which corresponds to the operating time 59 of laser 10. The further course of the frequency change after the first time interval 63 is insignificant, because the operating pause 60 of laser 10 occurs during the successive time interval 64. The function of the sensor shown in FIG. 4 is explained in detail in connection with the functional relationships shown in FIG. 5:

The modulator 55 transmits the modulation signal 54 to the laser 10 that activates the laser for the operating time 59, which is followed by the operating pause 60. During the operating time 59 the frequency of a beam 50 emitted by the laser 10 is varied by means of modulation signal 54, in which instance the maximum frequency difference 65 is determined in connection with alternate route 15 in order to obtain a predetermined heterodyne frequency at photodetector 21. The at least nearly linear rise in frequency 62 shown in the lower portion of FIG. 5 results in a heterodyne frequency at photodetector 21 that remains constant during this time. In place of the linear rise, a different, arbitrary characteristic can also be predetermined, with which, however, the heterodyne frequency is altered temporally. In comparison to the interval 33 shown in FIG. 2, the first time interval 63 is considerably shorter. The first time interval 63 is advantageously determined in such a manner that, during the first time interval 63, beams 51″, 52″ to be coupled out have not reached the photodetector 21 through the annular optical fiber arrangement 17 because of their running periods. The first time interval 63 is within, for example, the microsecond range when a length of, for example, several hundred meters is provided for the annular optical fiber arrangement 17. However, during the first time interval 63, reference beams 51‴, 52‴ guided via the short-circuit 53 already reach the photodetector 21 as coupled-out beams 51⁗, 52⁗. Coupled-out beams 51⁗, 52⁗ can be superposed either directly at the photodetector 21 or in the third coupler 19. The signal 58 emitted by photodetector 21 during the first time interval 63 and having the heterodyne frequency is evaluated with respect to its phase position in the comparator. The phase position of signal 58 during the first time interval 63 is compared with the signal 58 emitted subsequently by photodetector 21 during the second time interval 64. This signal is a result of the beams 51″, 52″ to be coupled out, which, after passing through the arrangement 17, are available only as long as the first time interval 63 has lasted Signals 51″, 52″ to be coupled out are superposed in the third coupler 19 as coupled-out signals 51⁗, 52⁗ and conducted to the photodetector 21. The rate of rotation can be determined from the determination of the difference of the phase position of the signal emitted by the photodetector 21 during the second interval 64 and the signal emitted during the first interval 63, and made available at the output 27 of the phase comparator 57. At the end of the second time interval 64, whose length is advantageously selected to be identical to time interval 63, the first time interval 63 follows again. With this measure, a maximum measuring rate without pauses is attained.

In the embodiments in FIGS. 1 and 4 of the sensor of the invention, it is possible to dispose the optical running period element 15 in one of the coupled-out beams 13‴, 14‴ (FIG. 1) or in one of the coupled-out beams 51⁗, 52⁗ (FIG. 4). With this measure it is achieved that the beams in the optical fiber arrangement 17 have the same frequency at all times. Phase disturbances that have various effects at different frequencies are then compensated.

Figure 6:
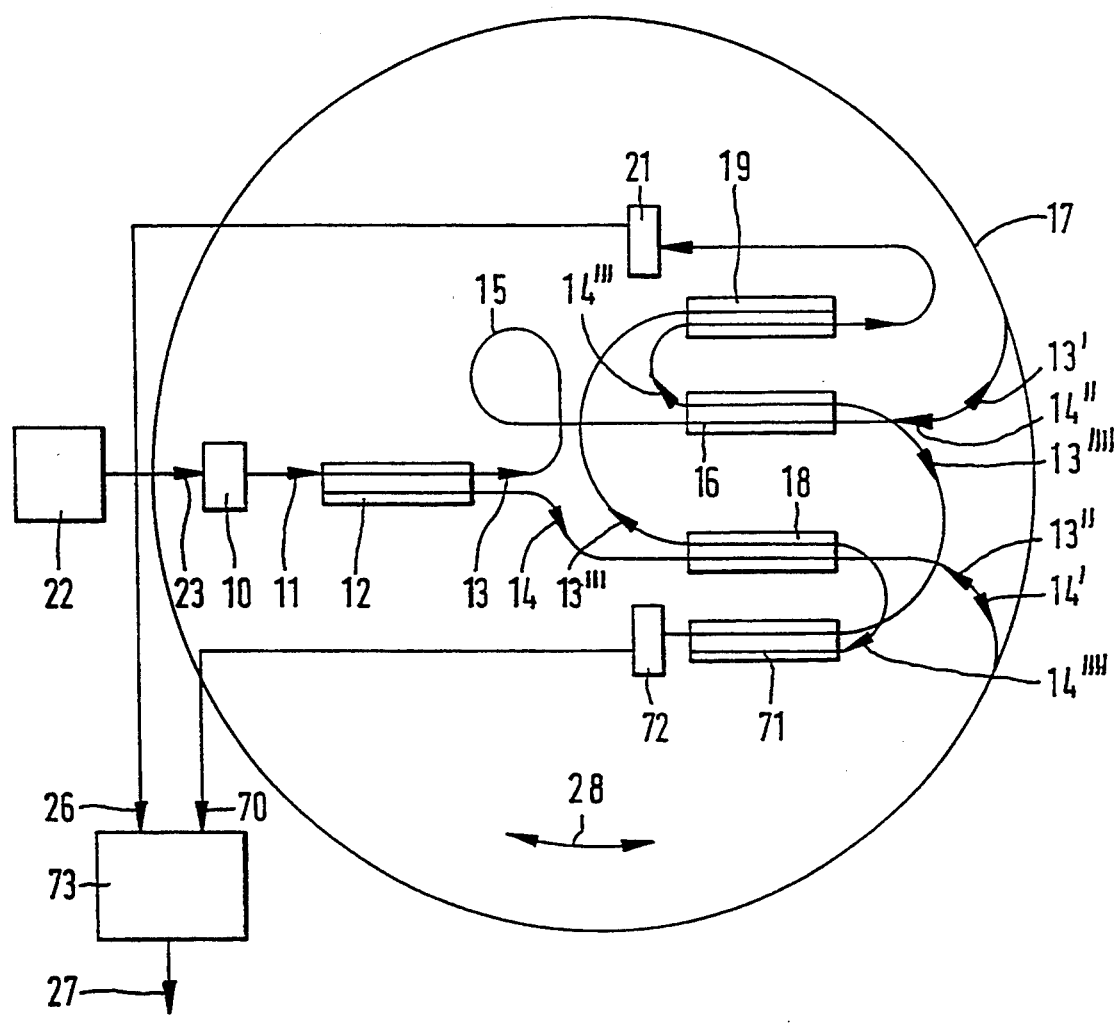
FIG. 6 shows a further embodiment of an optical sensor for rotational movements in accordance with the invention.

FIG. 6 shows a further embodiment of the sensor for rotational movements in accordance with the invention. Those parts that correspond to the parts shown in FIG. 1 have the same reference numerals in FIG. 6 as in FIG. 1. The sensor shown in FIG. 6 corresponds extensively in design and function to the sensor shown in FIG. 1. The essential difference is that a comparison signal 70, with which the output signal 26 of the photodetector 21 is compared, is obtained from the optical arrangement. A first reference beam 13⁗ is coupled out of the first partial beam 13 with the first coupler 16, and a second reference beam 14⁗ is coupled out of the second partial beam 14 with the second coupler 18. The two reference beams 13⁗, 14⁗ are superposed in a fourth coupler 71 and conducted to a second photodetector 72, which emits reference signal 70. For frequency modulation of the beam 11 of the laser 10, the modulation signal 23 is provided, which results in a modulation of beam 11 whose temporal characteristic corresponds to the example shown in FIG. 2. Modulator 22 need not make available any signal except modulation signal 23. Without additional control signals, phase comparator 25 can determine the phase difference from the signal 26 emitted by the photodetector 21 and reference signal 70 emitted by the additional photodetector 72, and make it available at the output 27 as a measure for the rate of rotation.

The fourth coupler 71 shown in FIG. 6 is not required for the basic function. It can also be omitted, in which case the two references 13⁗, 14⁗ are superposed directly at the additional photodetector 72.

In all embodiments, the different optical beams can be guided completely in optical fibers. A fifth coupler 12 that corresponds in design to the first and second couplers 16, 18 and the possibly provided third and fourth couplers 19, 71 is preferably provided as the means 12 for splitting the beam 11, 50 emitted by the laser. Couplers 12, 16, 18, 19, 71 preferably have respectively two coupling options on the front faces, wherein a coupling occurs as a function of the beam direction.

I claim:

1. An optical sensor for detecting rotational movements, comprising:

a laser beam source for emitting a beam;

a modulator for modulating a frequency of the beam of the laser beam source;

means for splitting the beam emitted by the laser into first and second partial beams;

an annular optical fiber arrangement having a first beam path extending in a first direction around the annular optical fiber arrangement and a second beam path extending in a second direction around the annular optical fiber arrangement, the first direction being opposite to the second direction, the first partial beam being coupled into the annular optical fiber arrangement in the first direction, and the second partial beam being coupled into the annular optical fiber arrangement in the second direction;

a first beam coupler in a beam path of the first partial beam and a beam path of the second partial beam which is coupled out of the annular optical fiber arrangement after the second partial beam has passed through the annular optical fiber arrangement;

a second beam coupler in a beam path of the second partial beam and a beam path of the first partial beam which is coupled out of the annular optical fiber arrangement after the first partial beam has passed through the annular optical fiber arrangement;

a photodetector for receiving a first coupled-out partial beam and a second coupled-out partial beam and for generating an output signal, the first coupled-out partial beam being derived from the first partial beam coupled out of the annular optical fiber arrangement, and the second coupled-out partial beam being derived from the second partial beam coupled out of the annular optical fiber arrangement;

an optical running period element in the beam path of one of the first partial beam, the first coupled-out partial beam, the second partial beam, and the second coupled-out partial beam; and a phase comparator for determining a phase difference between a signal related to the modulation of the frequency of the beam of the laser beam source and the output signal of the photodetector, and for determining a rate of rotation of the annular optical fiber arrangement based on a detected phase difference.

2. A sensor as defined in claim 1, wherein the optical beams are guided in optical fibers.

3. A sensor as defined in claim 1, further comprising a third coupler in the beam paths of the first and second coupled-out partial beams for superposing the first and second coupled-out partial beams.

4. A sensor as defined in claim 1, wherein the signal related to the modulation of the frequency of the beam of the laser beam source has a first time interval and the output signal of the photodetector has a second time interval, the first and second time intervals being substantially equal in duration.

5. A sensor as defined in claim 1, wherein the laser beam source is a semiconductor laser.

6. An optical sensor for detecting rotational movements, comprising:
    a laser beam source for emitting a beam, the laser beam source being activated for a first predetermined time interval and deactivated for a second predetermined time interval;
    a modulator for modulating a frequency of the beam of the laser beam source;
    means for splitting the beam emitted by the laser into first and second partial beams;
    an annular optical fiber arrangement having a first beam path extending in a first direction around the annular optical fiber arrangement and a second beam path extending in a second direction around the annular optical fiber arrangement, the first direction being opposite to the second direction, the first partial beam being coupled into the annular optical fiber arrangement in the first direction, and the second partial beam being coupled into the annular optical fiber arrangement in the second direction;
    a first beam coupler in a beam path of the first partial beam and a beam path of the second partial beam which is coupled out of the annular optical fiber arrangement after the second partial beam has passed through the annular optical fiber arrangement;
    a second beam coupler in a beam path of the second partial beam and a beam path of the first partial beam which is coupled out of the annular optical fiber arrangement after the first partial beam has passed through the annular optical fiber arrangement;
    a photodetector for receiving a first coupled-out partial beam and a second coupled-out partial beam and for generating an output signal, the first coupled-out partial beam being derived from the first partial beam coupled out of the annular optical fiber arrangement, and the second coupled-out partial beam being derived from the second partial beam coupled out of the annular optical fiber arrangement;
    an optical running period element in the beam path of one of the first partial beam, the first coupled-out partial beam, the second partial beam, and the second coupled-out partial beam;
    an optical short-circuit between the first and second couplers for supplying a portion of the first partial beam to the photodetector via the second beam coupler as a first reference beam, and for supplying a portion of the second partial beam to the photodetector via the first beam coupler as a second reference beam; and
    a phase comparator for determining a phase difference between a signal related to the modulation of the frequency of the beam of the laser beam source and the output signal of the photodetector, and for determining a rate of rotation of the annular optical fiber arrangement based on a detected phase difference.

7. A sensor as defined in claim 6, wherein the optical beams are guided in optical fibers.

8. A sensor as defined in claim 6, further comprising a third coupler for superposing the first and second coupled-out partial beams.

9. A sensor as defined in claim 6, wherein the first predetermined time interval and the second predetermined time interval are substantially equal in duration.

10. A sensor as defined in claim 6, wherein the laser beam source is a semiconductor laser.

11. An optical sensor for detecting rotational movements, comprising:
    a laser beam source for emitting a beam;
    a modulator for modulating a frequency of the beam of the laser beam source;
    means for splitting the beam emitted by the laser into first and second partial beams;
    an annular optical fiber arrangement having a first beam path extending in a first direction around the annular optical fiber arrangement and a second beam path extending in a second direction around the annular optical fiber arrangement, the first direction being opposite to the second direction, the first partial beam being coupled into the annular optical fiber arrangement in the first direction, and the second partial beam being coupled into the annular optical fiber arrangement in the second direction;
    a first beam coupler in a beam path of the first partial beam and a beam path of the second partial beam which is coupled out of the annular optical fiber arrangement after the second partial beam has passed through the annular optical fiber arrangement;
    a second beam coupler in a beam path of the second partial beam and a beam path of the first partial beam which is coupled out of the annular optical fiber arrangement after the first partial beam has passed through the annular optical fiber arrangement;
    a first photodetector for receiving a first coupled-out partial beam and a second coupled-out partial beam and for generating an output signal, the first coupled-out partial beam being derived from the first partial beam coupled out of the annular optical fiber arrangement, and the second coupled-out partial beam being derived from the second partial beam coupled out of the annular optical fiber arrangement;

an optical running period element in the beam path of one of the first partial beam and the second partial beam;

a reference photodetector for receiving a portion of the first partial beam coupled out of the first coupler as a first reference beam and a portion of the second partial beam coupled out of the second coupler as a second reference beam and for generating a reference signal; and a phase comparator for determining a phase difference between the reference signal of the reference photodetector and the output signal of the first photodetector, and for determining a rate of rotation of the annular optical fiber arrangement based on a detected phase difference.

12. A sensor as defined in claim 11, wherein the optical beams are guided in optical fibers.

13. A sensor as defined in claim 11, further comprising a third coupler in the beam paths of the first and second coupled-out partial beams for superposing the first and second coupled-out partial beams.

14. A sensor as defined in claim 13, further comprising a fourth coupler in a beam path of the first reference beam and a beam path of the second reference beam for superposing the first reference beam and the second reference beam.

15. A sensor as defined in claim 12, wherein the signal related to the modulation of the frequency of the beam of the laser beam source has a first time interval and the reference signal and the output signal of the reference photodetector and of the first photodetector, respectively, have a second time interval, the first and second time intervals being substantially equal in duration.

16. A sensor as defined in claim 14, wherein the means for splitting the beam emitted by the laser into first and second partial beams comprises a fifth coupler.

17. A sensor as defined in claim 11, wherein the laser beam source is a semiconductor laser.

* * * * *